April 30, 1968   W. JOHN   3,380,391
PUMP ROTOR
Filed Sept. 16, 1966
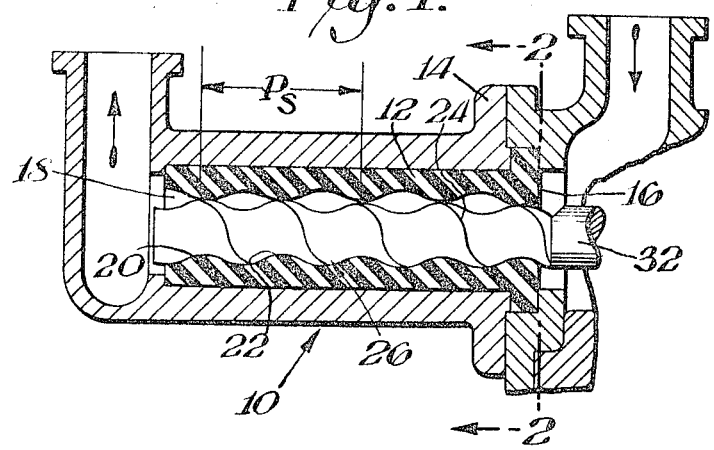
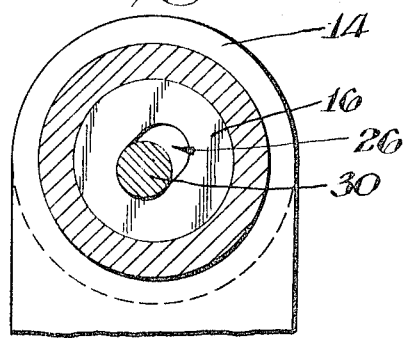
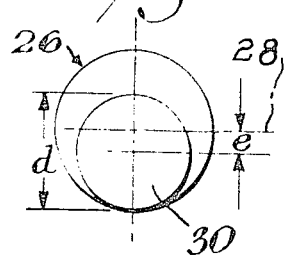
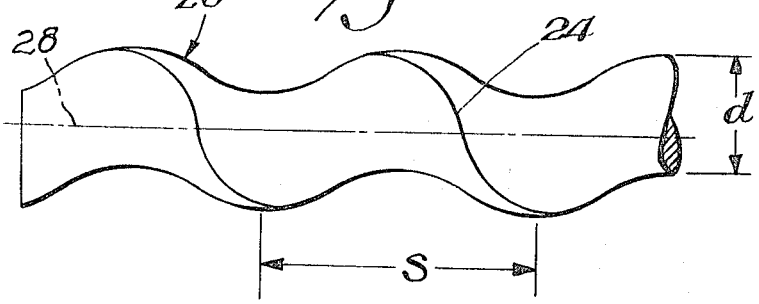

3,380,391
PUMP ROTOR
Willy John, Selb, Germany, assignor to Gebruder Netzsch, a company of Germany
Filed Sept. 16, 1966, Ser. No. 579,984
Claims priority, application Germany, Sept. 16, 1965, N 27,350; Mar. 12, 1966, N 28,195
4 Claims. (Cl. 103—117)

The present invention relates to a rotor for a pump and more particularly to a spiraled rotor for a pump of the screw type.

Prior to the prevent invention numerous rotor constructions have been proposed for rotary pumping machines but these constructions have failed to provide a spiraled rotor which produces maximum pumping efficiency. In the past, the relationship between the cross-section diameter of the rotary pumping element, and the pitch and eccentricity of the spiral was considered unimportant and therefore a mere choice of design. Moreover, the cross-section diameter of the heretofore available rotors together with the speed of rotor rotation were considered the only critical factors for maximum pump efficiency.

Accordingly, it is an object of the present invention to provide a spiraled single screw pump rotor which produces maximum pumping efficiency.

In accordance with the present invention a spiraled single screw pump rotor has a longitudinal axis and a circular cross-section the center of which spirals around the axis. The cross-section has a diameter at least five times the distance between its center and the axis, and the rotor spiral has a pitch at least two and one half times the cross-section diameter. This critical relationship based on the eccentricity of the circular cross-section with reference to the longitudinal axis of the rotor provides a spiraled single screw pump rotor which functions to produce pumping action of maximum efficiency.

Novel features and advantages of the present invention will become apparent to one skilled in the art from a reading of the following description in conjunction with the accompanying drawings wherein similar reference characters refer to similar parts and in which:

FIGURE 1 is a sectional view through a single screw pump including a rotor according to the present invention;

FIGURE 2 is a cross-sectional view taken along line 2—2 of FIGURE 1;

FIGURE 3 is an elevational view of the rotor according to the present invention; and FIGURE 4 is an end view of the rotor illustrated in FIGURE 3.

Referring in more particularity to the drawings, a rotary pump 10 of the single screw type comprises a cylindrical stator 12 suitably mounted in a pump housing 14. The stator may be constructed of resilient material and can include a flange portion 16 at one end that functions to accurately position the stator within the housing 14 when the pump 10 is assembled. The stator 12 also has a central longitudinal passageway 18 and a pair of threads 20, 22 formed on the side wall of the passageway. Each of the stator threads 20, 22 has an identical pitch which is represented in FIGURE 1 by the symbol P$s$. As explained more fully below, the stator threads cooperate with the single thread 24 of a spiraled rotor 26 to produce the pumping action.

The spiraled single screw pump rotor 26 according to the present invention has a longitudinal axis 28 and a circular cross-section 30. The cross-section 30 is circular in configuration regardless of where the section is taken and the center of the cross-section spirals around the axis 28 of the rotor. The eccentricity of the spiraled rotor 26 is determined by calculating the distance between the center of the circular cross-section 30 and the longitudinal axis 28. This eccentricity serves as the primary factor for determining the dimensions of a particular rotor. The eccentricity is selected so that the greatest possible conveying space is obtained by using a minimum quantity of material for construction of the rotor, and also without unduly complicating the manufacture of the rotor and the stator with which it cooperates. Once a value for rotor eccentricity is selected the rotor is constructed so that the cross-section 30 has a diameter of from five to six times the eccentricity value. The pitch S of the rotor spiral is also related to the eccentricity $e$ and the cross-section diameter $d$, and has a value of from two and one half to three times the cross-section diameter. This relationship of eccentricity $e$, cross-section diameter $d$, and spiral pitch S of the single screw pump rotor 26 produces a rotor which cooperates with the stator 14 to provide a pump having the greatest possible conveying space. Not only is the capacity of the pump increased considerably in comparison to the heretofore available pumping arrangements but the rotor and stator are easy to manufacture and require a minimum quantity of construction material.

Pumping capacity can be increased 300 percent over prior devices by constructing a pump rotor as described above. Preferably the cross-section diameter $d$ is six times the eccentricity $e$ and the pitch S of the rotor spiral three times the cross-section diameter. With this preferred ratio the pump capacity is increased 20 percent over the capacity of a pump having a rotor with a cross-section diameter five times the eccentricity and a pitch two and one half times the cross-section diameter.

In operation the spiraled single screw pump rotor is connected at end 32 to a suitable driving mechanism (not shown). As the rotor turns a liquid is conveyed through the passageway 18 and out of the pump in the direction illustrated in FIGURE 1. For further details of rotary pump operation see Standards of Hydraulic Institute, copyright 1947 by Hydraulic Institute, eighth edition.

What is claimed is:

1. In a spiraled single screw pump rotor having a longitudinal axis and a circular cross-section the center of which spirals around the axis, the improvement according to which (a) the cross-section has a diameter at least five times the distance between its center and the axis, and (b) the spiral has a pitch at least two and one half times the cross-section diameter.

2. The combination of claim 1 in which the cross-section has a diameter six times the distance between its center and the axis.

3. The combination of claim 1 in which the spiral has a pitch three times the cross-section diameter.

4. The combination of claim 1 in which the cross-section has a diameter six times the distance between its center and the axis, and the spiral has a pitch three times the cross-section diameter.

References Cited
UNITED STATES PATENTS

| | | | |
|---|---|---|---|
| 1,892,217 | 12/1932 | Moineau | 103—117 M |
| 2,028,407 | 1/1936 | Moineau | 103—117 M |
| 2,085,115 | 6/1937 | Moineau | 103—117 M |
| 3,299,822 | 1/1967 | Payne | 103—117 M |

FOREIGN PATENTS 544,242  3/1956  Italy.

HENRY F. RADUAZO, *Primary Examiner.*